July 29, 1969  H. A. DOREY  3,458,809
DUAL-SLOPE ANALOG-TO-DIGITAL CONVERTERS
Filed Aug. 23, 1965

United States Patent Office 3,458,809
Patented July 29, 1969

3,458,809
DUAL-SLOPE ANALOG-TO-DIGITAL CONVERTERS
Howard A. Dorey, Farnborough, England, assignor to The Solartron Electronic Group Limited, Farnborough, Hampshire, England, a corporation of the United Kingdom
Filed Aug. 23, 1965, Ser. No. 481,853
Claims priority, application Great Britain, Aug. 24, 1964, 34,543/64
Int. Cl. G01r 17/06
U.S. Cl. 324—99    11 Claims

ABSTRACT OF THE DISCLOSURE

An analog to digital converter includes an integrating circuit which operates cyclically under the control of a counter fed by clock pulses, and has a constant period conversion cycle divided into two parts. In the first part, an analog input signal, and more specifically an input current dependent upon the voltage to be measured, and a reference signal, and more specifically discrete reference charges, are fed into the integrating current in polarity opposition to each other. The magnitude of the reference signal is such that the output level of the integrating circuit moves in one direction to a reference signal level which defines the end of the first part and stops the flow of reference signals to the integrating circuit. In the second part, the analog input current flows alone and the integrating circuit output moves in the other direction until the end of the conversion cycle. After a succession of conversion cycles, the integrating circuit output stabilizes and the time required to generate the corresponding reference charges applied to the integrator in the first part is clocked by the counter to provide a digital representation of the analog signal magnitude.

---

Figure 1:
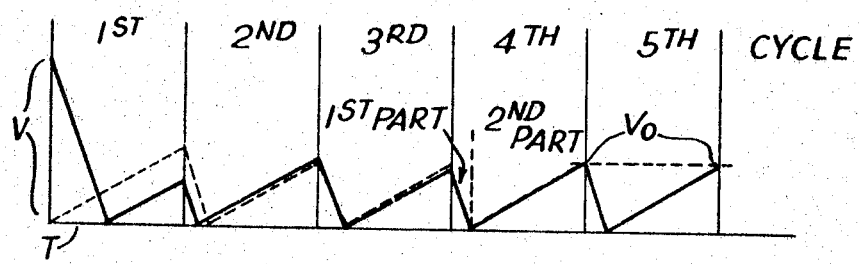

This invention relates to digital voltmeters (or analogue to digital converters) of the kind wherein a current proportional to the input voltage and quanta of charge are fed into an integrating amplifier in opposition to each other, the magnitude of the input voltage being given in terms of a count of the said quanta. Throughout this specification and the appended claims the expression quantum of charge (plural quanta of charge) means a pulse of current which has a fixed quantity of charge. Many proposals of this kind utilize a master source of clock pulses which are counted to provide a measure of time of application of the input voltage. Furthermore the quanta of charge are produced synchronously with the clock pulses, quanta being fed into the amplifier during some clock pulses but not others. The digital measure $n$ of the input voltage is the count of quanta actually fed into the amplifier, $n$ being interpreted in accordance with the relation $n\Delta q = NTV/R$ where $N$ is the number of clock pulses in the interval of time which the input voltage $V$ is applied through a resistor $R$ and $T$ is the clock pulse period. In such arrangements two counters are usually required: one to count clock pulses (i.e. to count $N$) and the other to count quanta of charge (i.e. to count $n$). Fast pulse counters are relatively expensive items of equipment.

It is already known to avoid the need for two counters by applying the input voltage and the quanta of charge in two separate intervals of time. During the first interval the input voltage is applied and clock pulses are counted, that is to say a standard number $N$ is counted. During the second interval the quanta are fed into the amplifier and the number $n$ of quanta necessary to restore the amplifier output to datum is counted, using the same counter. This datum is determined by a threshold circuit which must provide an accurate value in relation to the output signal level of the amplifier at the commencement of the measurement. Such circuits are described in "Waveforms" by Chance et al., published by the McGraw-Hill Book Co. Inc., New York, 1949, in Section 9.2, and some difficulties attending the maintenance of their accuracy are described in chapters 3 and 9 of that book. The present invention represents a development of this known arrangement which makes the actual value of the threshold level entirely immaterial and in which no precautions have to be taken to ensure that the output level of the amplifier has any particular value at the commencement of a measurement.

Provided the mark-space ratio of the clock pulses (hence of the current pulses which constitute the quanta of charge) remains fixed, the instrument is not affected by long term variations in clock frequency and a relatively cheap clock source may therefore be used. The mark-space ratio of pulses is of course the ratio of the duration of a pulse to the duration of the intervals between pulses.

It will be explained that during each of certain periods quanta are fed from a source into the amplifier at a constant repetitive rate. In defining and describing the invention, it will be convenient to call the current which flows towards the amplifier from the input, the "input current," and to call the mean value over such a period of the current which flows towards the amplifier from the source of quanta the "quantum current."

According to the present invention there is provided a digital voltmeter comprising an integrating amplifier, a threshold circuit responsive to the amplifier output level, a source of clock pulses, a clock pulse counter, and means responsive to the clock pulses for feeding quanta into the amplifier, the meter being arranged to operate cyclically under the control of the counter, each cycle being of equal duration and divided into first and second parts under the control of the threshold circuit, in one of which parts both input and quantum currents flow and in the other of which one only of these currents flows, the relative values of these currents being such that, in the first part of each cycle the output level of the amplifier moves in one direction to the threshold level set by the threshold circuit, whilst in the second part of each cycle the output level moves in the other direction until the end of the cycle, determined by the counter, reaching a level which after some cycles does not change from cycle to cycle.

This voltmeter has the property that the relative durations of the two parts of the cycle (when the meter has stabilized) are determined by the relative magnitudes of input current and quantum current. The duration of one part only (conveniently the first part) may eventually be determined by counting the clock pulses in the said one part only and this enables the input voltage to be determined.

Figure 2:
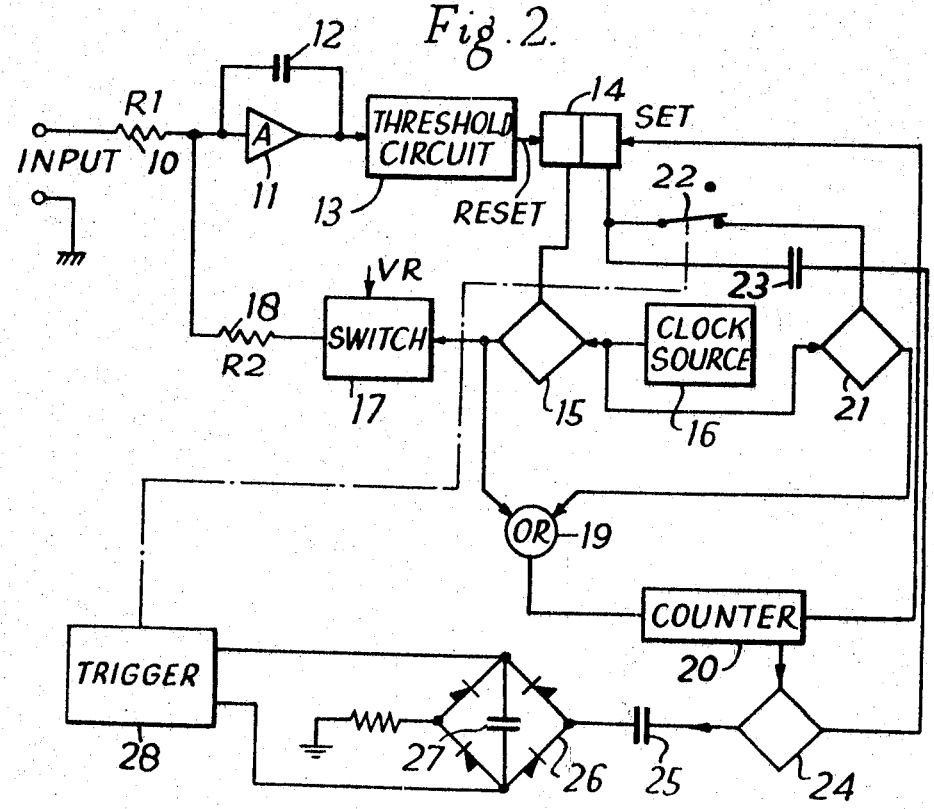

The invention will be further described by way of example with reference to the accompanying drawings, in which:

FIG. 1 is an explanatory diagram, and
FIG. 2 is a block diagram of one embodiment.

The following description is restricted to the case where input current flows during the whole cycle and quantum current during the first part of each cycle, though the quantum current could flow instead during the second part only of each cycle and the roles of input and quantum current could be interchanged, provided the appropriate changes are made to the restriction on the relative values of the currents. The general restriction is that the slopes of the output signal during the first and second parts of the cycle must be of opposite sign and the magnitude of the slope in the second part must not exceed the magnitude of the slope in the first part.

FIG. 1 shows as a function of time the output voltage of an integrating amplifier. The base line T of the voltage is the operating level of a trigger circuit connected to the integrating circuit. The march of the output voltage is seen to be a march of connected straight lines. These lines are broken at trigger level and at constant intervals representing successive operating cycles of the invention, and it will be explained why these breaks occur at such points that the output voltage eventually moves between T and a fixed level $V_o$, whatever the initial voltage level. FIG. 1 shows to illustrate this, two alternative marches, one (in full lines) starting from a value above T and the second (in broken lines) starting from level T.

Thus whatever the initial voltage level V in relation to the trigger level T, the system settles down to the same steady state (in which the fall and rise times, that is to say the durations of the first and second parts of each cycle, are inversely proportional to the magnitudes of the slopes in the two parts). FIG. 1 shows the process for two different starting values in full and broken lines respectively. The curves rapidly merge and by the 5th cycle the level $V_o$ at the end of the cycle has stabilized.

FIG. 2 shows one circuit embodiment for setting up the above situation. The input voltage V is applied through resistor 10 of value R1 to an operational amplifier 11 having capacitive feedback through a capacitor 12. The amplifier output is applied to a threshold circuit 13 and so long as the output is above the threshold level, a bistable 14 remains set and keeps open a gate 15. Clock pulses pass through the gate from the source 16 and open a switch 17, so applying a voltage VR through a resistor 18 of value R2 to the input of the amplifier 11. Each quantum of charge fed in as the switch opens is of magnitude $$\frac{\Delta T \cdot VR}{R2}$$

where $\Delta T$ is the duration of a clock pulse. The quantum current, as hereinbefore defined, is $$\frac{\Delta T \cdot VR}{R2}$$

where T is the clock pulse period. The input current is $V/R1$. These currents are of opposite sign and as will hereinafter become clear the quantum current must be at least twice the magnitude of the input current. The pulses passing through gate 15 also pass through an OR gate 19 to a counter 20.

When the amplifier output level falls to the threshold level set by circuit 13, the bistable 14 is reset and gate 15 is closed. Another gate 21 is opened however so long as a switch 22 is closed and pulses from the source 16 pass now through this gate 21 and the OR gate 19 to the counter 20. When the counter fills, it sets the bistable 14 and another cycle commences.

The rate of rise in the second part of each cycle is $kV$ where $k$ is a constant determined by R1. The rate of fall in the first part is $k(b-V)$ where $b$ is another constant, determined by the quantum current. Suppose that in the $p$'th cycle the fall time is $t_p$. The rise time is therefore $t_c - t_p$ where $t_c$ is the period of the cycle. The output therefore rises in the second part of the $p$'th cycle to $kV(t_c - t_p)$ taking the threshold level as zero for convenience. The time taken to fall back to zero in the $(p+1)$'th cycle is accordingly $$kV\frac{(t_c - t_p)}{k(b-V)}$$

But this is $t_p + 1$ and so $$t_p + 1 = \frac{(t_c - t_p) \cdot V}{(b-V)}$$

which may be written as $$t_p + 1 = t + rt_p$$

This gives the formula $$t_p + 1 = a \sum^{p} r^q + r^p + 1_{t_o}$$

The series converges and the right hand term tends to zero is $|r| < 1$. Now $$r = \frac{-V}{b-V}$$

and assuming V to be algebraically positive, the condition of convergence is $b > 2V$.

The limiting value of $t_p$ is then $$Lt(t_p) = \frac{a}{1-r}$$

$$p \to \infty$$

$$= \frac{t_o V/(b-V)}{1 + V/(b-V)}$$

$$= \frac{t_o V}{b} = t_c \cdot \frac{V}{VR} \cdot \frac{R2}{R1}$$

In operation the meter is run for sufficient cycles to arrive substantially at this result and then switch 22 is opened, whereupon $t_p$ only is counted into the counter 20. $t_p$ is less than $\frac{1}{2} t_c$ and so the counter 20 is less than half filled. The bistable 14 is not set and the count of $t_p$ is frozen in the counter for reading.

Since it is extremely important to maintain a constant mark space ratio for the clock pulses from the source 16, these pulses may be derived by dividing pulses from a master source by an even number, thus obtaining identical pulses defining the mark and space portions of each clock cycle and hence an accurately fixed mark-space ratio of 1:1.

The operation of the switch 22 must be interlocked with the bistable 14 (using conventional techniques) so as not to open when the bistable is in the reset state and in practice other means than those shown may be used for switching over to count $t_p$ after the meter has stablized. For example the system may be made wholly automatic by using the switching of the bistable 14 to the reset state to gate a signal from an early stage of the counter 20, in other words to sample one low significance digit in the number $t_p$ in the counter. Until a steady state is reached, the gated signal will display considerable noise, (i.e. will sometimes be 0 and sometimes be 1) and the noise may be used to hold the switch 22 closed. When the noise falls below a predetermined values, the switch 22 opens and the final count of $t_p$ enters the counter 20.

One arrangement for performing this function is illustrated in FIG. 2 when the bistable 14 resets (at $t_p$) a pulse derived through a capacitor 23 opens a gate 24 for a short interval. This gate is connected to an early (low significance stage) of the counter 20 and the voltage level at this stage is sampled, having one value for 0 and another value for 1. A corresponding pulse is derived through a capacitor 25 and full wave rectified by a bridge rectifier 26 with a load capacitor 27. The voltage across this capacitor controls a trigger circuit 28 which in turn operates the switch 22. The capacitor 27 charges rapidly through the bridge rectifier 26 but discharges only slowly. So long as the voltage level sampled by the gate 24 changes from time to time, the capacitor is kept charged and the trigger circuit 28 holds the switch 22 closed. When however the voltage level does not change, the capacitor 27 discharges and the trigger circuit 28 opens the switch 22.

I claim:

1. An analog to digital converter comprising, integrating means for producing an output signal waveform comprised of first and second integrating means output signals of opposite respective slopes, input circuit means for continuously applying the analog input signal to said integrating means for at least the time period required to generate said output signal waveform, said integrating means being responsive to the applied analog input signal for producing a first integrating means output signal proportional to the time integral of said analog input signal, a source of clock pulses, a pulse counter driven by said clock pulses and producing a counter output signal upon receiving a predetermined number of clock pulses, bistable means having at least two inputs and an output, means coupling said counter to one of the two bistable means inputs, said bistable means being responsive to said counter output signal and producing a first bistable means output signal in response thereto, means coupled to said bistable means output and responsive to said first bistable means output signal for applying a plurality of equal-valued, incremental referencesignals of opposite polarity to the coincidentally applied analog input signal, whereby said integrating means produces said second integrating means output signal which is directed toward a reference signal level, said bistable means also being responsive to the output of said integrating means and having the other of said bistable means inputs coupled thereto, and producing a second bistable means output signal in response to the second integrating means output signal attaining said reference signal level, the number of pulses counted by said counter from the production of said counter output signal to the production of said second bistable means output signal providing a digital representation of the analog input signal magnitude.

2. The converter as claimed in claim 1 wherein said means coupled to the bistable means output comprises, a reference signal source of opposite polarity to, and of greater magnitude than, said analog input signal, and signal control means coupled to said reference signal course, to the output of said bistable means and to the clock pulse source and responsive to said first bistable means output signal and to coincidentally received clock pulses for supplying one quantum of charge from said reference signal source to the input of said integrating means for each received clock pulse.

3. The converter as claimed in claim 1 wherein said counter recycles periodically so that said integrating means produces a plurality of output signal waveforms, and means responsive to said waveforms attaining a steady state condition for providing a corresponding digital representation of said analog signal magnitude.

4. The converter as claimed in claim 3 which additionally comprises, a signal gating device for passing clock pulses to said counter when enabled and for blocking the passage of clock pulses to said counter when disabled, and wherein said means responsive to the integrating circuit waveforms attaining a steady state condition is coupled to said gating device and causes the disabling thereof when said steady state condition is attained.

5. The converter as claimed in claim 2 wherein said signal control means comprises a signal gating device which opens in response to said first bistable means output signal and closes in response to said second bistable mean output signal.

6. An analog to digital converter comprising, integrating means for generating at the output thereof a succession of output signal waveforms, each waveform being comprised of first and second output signals of opposite slope, a source of clock pulses, pulse counter means coupled to the clock pulse source for counting said clock pulses and producing a counter means output signal upon receiving a predetermined number of clock pulses, input circuit means for continuously applying the analog input signal to said integrating means for at least the time required to generate a plurality of successive waveforms, first means responsive to each counter means output signal for applying to the input of said integrating means a reference signal of opposite polarity to, and of greater magnitude than, the coincidentally applied analog input signal so that said integrating means is caused to generate a second integrating means output signal which is directed toward a reference signal level, said integrating means integrating the analog input signal without said reference signal being applied to generate said integrating means first output signals and said counter means recycling periodically so that said integrating means generates a plurality of successive waveforms, and means coupled to said counter means and operative in response to said counter means attaining at least a substantially steady state condition for providing a digital representation of the number of pulses received by said counter means from the production of a corresponding counter means output signal to the attaining of said reference signal level by a corresponding one of said integrating means second output signals.

7. An analog to digital converter comprising, integrating means for generating at the output thereof a succession of output signal waveforms, each waveform being comprised of first and second output signals of opposite slope, a source of clock pulses, a clock pulse counter for counting said clock pulses and producing a counter output signal upon receiving a predetermined number of clock pulses, input circuit means for continuously applying the analog input signal to said integrating means for at least the time required to generate a plurality of successive waveforms, first means responsive to each counter output signal for applying to the input of said integrating means a reference signal of opposite polarity to, and of greater magnitude than, the coincidentally applied analog input signal so that said integrating means is caused to generate a second integrating means output signal which is directed toward a reference signal level, said integrating means integrating the analog input signal without said reference signal being applied thereto to generate said integrating means first output signals, said counter recycling periodicaly so that said integrating means generates a plurality of successive waveforms, and means responsive to at least one of said output signal waveforms attaining at least a substantially steady state condition for providing a digital representation of the number of pulses applied to said counter from the production of a corresponding counter output signal to the attaining of said reference signal level by a corresponding one of said integrating means second output signals.

8. An analog-digital converter comprising, integrating means for generating a succession of output signal waveforms, each waveform being comprised of first and second output signals of opposite slopes, input circuit means for continuously applying the analog input signal to said integrating means for at least the time required to generate a plurality of said output signal waveforms, a source of clock pulses, a pulse counter driven by said clock pulses and producing a counter output signal upon receiving a predetermined number of clock pulses, said counter including a plurality of digital stages, bistable means having at least two inputs and an output and responsive to each counter output signal for producing a first bistable means output signal, means coupled to said bistable means output and responsive to each first bistable means output signal for aplying a reference signal of opposite polarity to, and of greater magnitude than, the coincidentally applied analog input signal, whereby said integrating means generates a second integrating means output signal which is directed toward a reference signal level, said counter recycling periodically so that said integrating means generates a plurality of successive waveforms, said bistable means also being responsive to the output of said integrating means, being coupled thereto by the other of said bistable means inputs and producing a second bistable means output signal in response to each second integrating means output signal attaining said reference level, and means conditioned by said second bistable means output signal and responsive to at least one of said counter stages producing the same consecutive digital values upon consecutive attainments of said reference level by said second integrating output signals for providing a corresponding digital representation of said analog input signal magnitude.

9. An analog to digital converter comprising, an integrating circuit having an input, a source of clock pulses and means for counting the clock pulses, a reference signal source and means including the counting means for successively applying said reference signal source to the integrating circuit input, said counting means clocking the time interval during which said reference signal source is applied to said integrating circut, means for applying an analog signal to said integrating circuit input at least concidentally with the application of said reference signal source thereto, means for decoupling said reference signal source from said integrating circuit input when said integrating circuit output attains a threshold signal level, and means coupled to said counting means for selecting one of said time intervals during which said reference source is applied to said integrating circuit input as being an accurate function of the analog signal magnitude.

10. The converter as claimed in claim 9 wherein said counting means comprises a plural stage counter which recycles to produce periodic time base signals and wherein said means for applying said reference signal source to said integrating input is responsive to each of said periodic signals.

11. The converter as claimed in claim 9 wherein said reference signal comprises a plurality of electrical charges synchronized to said clock pulses.

References Cited

UNITED STATES PATENTS

| | | | |
|---|---|---|---|
| 2,979,708 | 4/1961 | Jorgensen | 324—99 |
| 3,087,147 | 4/1963 | Norris et al. | 341—111 XR |
| 3,140,479 | 7/1964 | Chase | 324—111 XR |
| 3,188,455 | 6/1965 | Quick | 340—347 XR |
| 3,237,190 | 2/1966 | Summers | 340—347 |
| 3,296,613 | 1/1967 | Andersen et al. | 340—347 |
| 3,316,547 | 4/1967 | Ammann | 340—347 |
| 3,368,149 | 2/1968 | Wasserman | 324—111 XR |

RUDOLPH V. ROLINEC, Primary Examiner

ERNEST F. KARLSEN, Assistant Examiner

U.S. Cl. X.R.

340—347